United States Patent [19]

Potter et al.

[11] 4,440,517
[45] Apr. 3, 1984

[54] ADJUSTABLE TORQUE-MULTIPLIER BREAKER-BAR

[76] Inventors: Michael A. Potter, 8253 Grand Ave.; Richard L. Green, 7671 Joshua View, both of Yucca Valley, Calif. 92284

[21] Appl. No.: 246,366

[22] Filed: Mar. 23, 1981

[51] Int. Cl.³ ............................................. F16B 21/00
[52] U.S. Cl. ..................................... 403/24; 403/328; 81/177 A; 16/115
[58] Field of Search ............... 403/328, 107, 109, 108, 403/24; 81/177 A; 16/115; 248/408

[56] References Cited

U.S. PATENT DOCUMENTS

| | | | |
|---|---|---|---|
| 1,234,455 | 7/1917 | Fox | 403/328 X |
| 1,284,351 | 11/1918 | Jagielo | 81/177 A |
| 1,741,969 | 12/1929 | Bellows | 403/DIG. 6 |
| 2,051,953 | 8/1936 | Leathers | 81/177 A |
| 2,263,508 | 11/1941 | Lee | 81/177 A |
| 2,282,148 | 5/1942 | Mandl | 81/177 A |
| 2,777,692 | 1/1957 | Marzucco | 248/408 |
| 2,963,930 | 12/1960 | Clothier et al. | 81/177 A |
| 3,306,639 | 2/1967 | Lyon | 403/107 |
| 4,047,821 | 9/1977 | Hoke et al. | 403/328 X |
| 4,070,932 | 1/1978 | Jeannotte | 81/177 A |

*Primary Examiner*—Andrew V. Kundrat
*Attorney, Agent, or Firm*—Paul H. Ware

[57] ABSTRACT

An adjustably extensible torque-multiplier breaker-bar for applying variable torques to a tool headpiece. The device employs a telescoping inner member received within a sleeve member thus comprising a breaker-bar which permits the user to exploit the advantages of the principles of physics involved. An outer sleeve member carries a slideably adjustable inner member such that both members provide cooperatively for stepped length adjustment so as to shorten or lengthen the overall longitudinal dimension of the telescoping breaker-bar. Such extension and retraction allows a user to modify the mechanical advantage of the tool in accordance with mechanical theories of physics.

4 Claims, 4 Drawing Figures

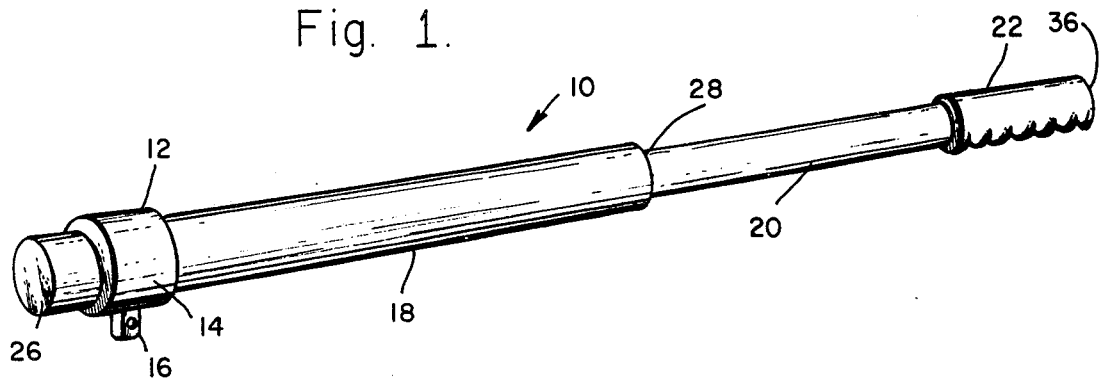
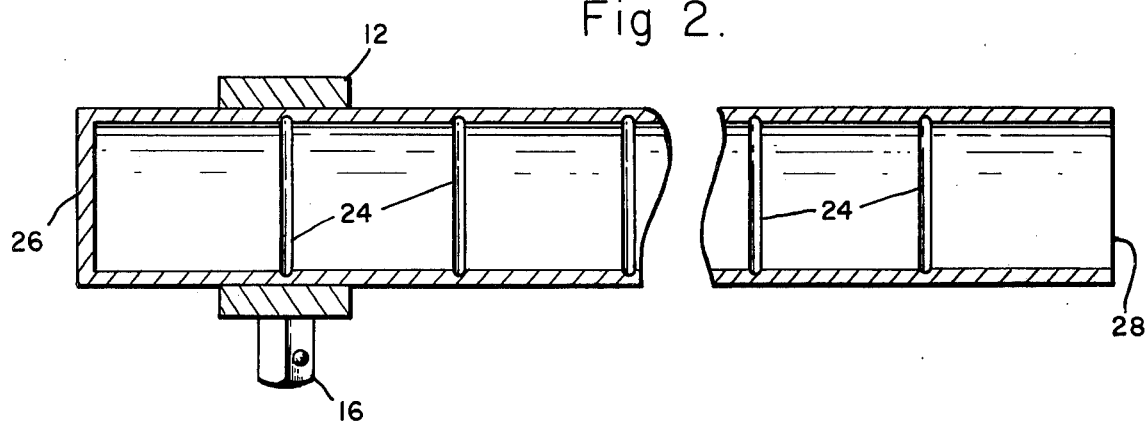
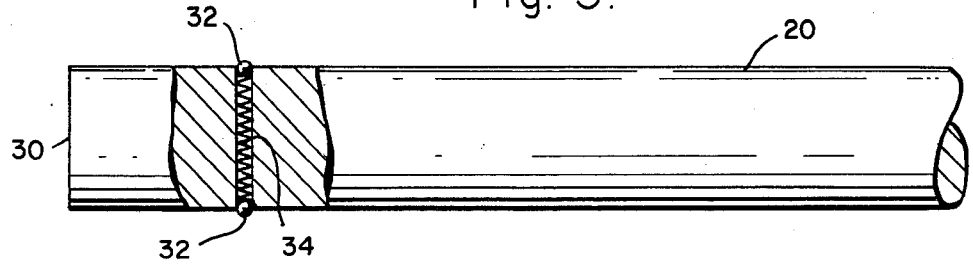
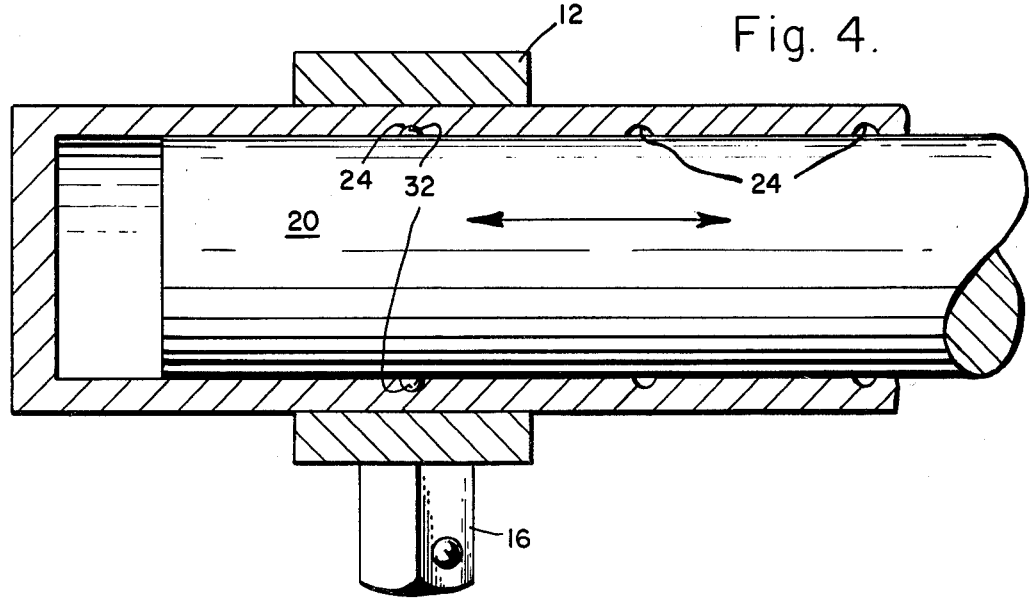

ADJUSTABLE TORQUE-MULTIPLIER BREAKER-BAR

BACKGROUND OF THE INVENTION

1. Field of the Invention

This invention relates generally to mechanic's tools and more particularly to tools useful in facilitating the removal of thread locked or "stuck" nuts or bolts where it is necessary to bring a large torque to bear about the axis of the stuck element.

2. Description of the Prior Art

Torque, sometimes denotned the moment of a force about an axis, is the effectiveness of that force in producing rotation about that axis. Torque is measured by the product of the incident force with the perpendicular distance from the axis to the line of action of that force. Of course, the inventive device described herein does not vary the incident force, however, by adjusting the length of the device, the perpendicular distance from the axis is varied thus modifying the torque, the moment of the force about the axis. Thus, it is a fact of common experience that the longer the lever arm of the breaker-bar tool at our disposal, the easier it is to break a thread lock between a nut and a bolt, for instance.

While presently available extensible handles for tool headpieces can also vary applied torque by changing the lever arm, i.e., the perpendicular distance from the axis of desired rotation to the line of action of the applied force, some disadvantages of these prior art devices include limited numbers of positions to which adjustment can be effected in order to vary the lever arm. In one particular case, the total number of positions available is only two, being one position in which an inner member is completely retracted, the shorter position, and the other position in which the inner member is completely extended, the longer position. The tool in question is complicated to fabricate, having a spring-loaded inner member and machined surfaces and slots that increase production expense. In another case, an inner member is restricted to a hexagonal cross sectional shape requiring slots to be machined on one flat face thereof and having an adjustment locking mechanism comprising multiple small parts contributing to a higher fabrication cost and likelihood of malfunction. An additional particularly interesting prior art device includes ellipsoidal detents machined into an inner member for the acceptance of a metal ball utilized to maintain the integrity of adjustment. The metal ball so utilized is held captive by means of a cylindrical sleeve of complicated inner machining, being itself spring-loaded and having inwardly projecting rims, a ball chamber and a spring chamber. While the tool presents an interesting mechanical design, it is complicated and expensive and may be prone to disorder when compared to the device contemplated by the present invention. Yet another torque-varying device provides for but two positions while presenting a complicated machining problem with its attendant expensive fabrication cost and proclivity for breakdown. One of the most interesting of the devices encountered in applicant's novelty search is the tool described by Hoke et al in U.S. Pat. No. 4,047,821 for BREAK RESISTANT TELESCOPING TOOL. The tool is described as " . . . insulative, multi-section, break-resistant telescoping tool especially adapted for work around energized electrical lines . . . . " One of the main advantages of the tool described resides in its having " . . . imperforate bases which preclude air flow centrally . . . to thereby prevent the quick escape of air . . . during nesting retraction of the tool which serves to cushion such retractive movement and prevent inadvertent breakage of the sections." It is thus the shock-absorptive effects of the motions during retraction of the tool sections that appears to be of prime interest in this particular device.

These prior art devices among other disadvantages, have been unreliable and unpredictable in operation as a result of their complicated designs, and have been expensive and difficult to manufacture. At least one of the devices has met only a special need as presented by a specific problem and thus has served only a narrow purpose. Some of these prior art devices have been described in the following listed patents that were brought to the attention of applicant's attorney through a novelty search conducted in the U.S. Patent and Trademark Office:

| U.S. Pat. No. | Patentee | Shortened Title |
| --- | --- | --- |
| 4,070,932 | Jeannotte | Extensible Handle |
| 4,047,821 | Hoke et al | Break Resistant |
| 3,306,639 | Lyon | Extensible Torque Rod |
| 2,963,930 | Clothier | Extensible Torque Bar |
| 2,282,148 | Mandl | Tool Handle |
| 2,263,508 | Lee | Extensible Handle Assembly |

It would thus be a great advantage to the art to provide an adjustable, torque-multiplier breaker-bar that is economical and uncomplicated to fabricate.

Another great advantage would be the provision of an adjustable, torque-multiplier breaker-bar that is easy to adjust.

A further desirable advantage would be realized in a tool of the type contemplated by the present invention by the provision of multiple adjustments while maintaining the advantage of ease of adjustment mentioned above.

A still further advantage would be found in the maintenance of the integrity of length settings without the incorporation of complicated mechanisms.

Yet another important advantage would be defined in a tool of the type contemplated by the present invention if the tool could be made simple and easy to use while retaining the advantages previously mentioned.

SUMMARY OF THE INVENTION

It is an object of the present invention to provide an adjustable, torque-multiplier breaker-bar that is economical and uncomplicated to fabricate.

Another object of the instant invention is the provision of an adjustable, torque-multiplier breaker-bar that is easy to adjust.

A further object of the device contemplated by the invention is the provision of multiple adjustments.

A still further object of the present invention is realized by the maintenance of the integrity of the adjusted length settings while retaining the above described objectives and yet without the incorporation of complicated mechanisms.

In the accomplishment of these and other objects, an adjustable, torque-multiplier breaker-bar is provided that includes a rod slideably situate in a sleeve having means to adjust the effective length of the combination thus formed by varying the amount of insertion of the rod into the sleeve. Means to vary said insertion and to maintain the adjustment so effected in stepped position from one varied length to another. One end of the rod supports a handle or hand grip while the end of the sleeve furthest from the hand grip carries a head piece comprising a head piece collar fitted in an annular fashion about that end of the sleeve, said head piece collar having a tool-holding member. In what follows, the end of the tool carrying the hand grip, because of its proximity to the user, will be referred to as the proximal end. This proximal end of the tool is thus seen to be the end of the inserted rod that carries the hand grip. The other end of the rod shall be denoted the distal end. The other extreme end of the tool, that is, the end of the sleeve furthest from the hand grip, shall be referred to as the distal end of the tool.

It is a well known principle of physics that the moment of a force about an axis, called the applied torque, is equal to the product of the force and the lever arm where the lever arm is defined herein as the perpendicular distance from the line of action of the force to the point of application of the torque, i.e., the axis. Written in equation form, we have $$torque = force \times lever\ arm.$$

Thus, given a constant force, the torque applied to an axis may be varied by varying the length of the lever arm. If the lever arm is made larger, torque is increased for a given force applied. It is the purpose of the inventive device here disclosed to provide for a greater or lesser applied torque by varying the lever arm in the above equation.

BRIEF DESCRIPTION OF THE DRAWINGS

Further advantages and features of the present invention will be more fully apparent to those skilled in the art to which the invention pertains from the ensuing detailed description thereof, regarded in conjunction with the accompanying drawings wherein like reference characters refer to like parts throughout and in which:

FIG. 1 is a perspective view of the device.

FIG. 2 is a fragmentary cross sectional view of the sleeve and the tool-holding headpiece of the invention.

FIG. 3 is a fragmentary cut away cross sectional view of the distal end of the rod showing a part of the position latching mechanism.

FIG. 4 is a fragmentary cross sectional view of the inventive device showing the rod inserted into the sleeve and being held in an adjustment position.

DETAILED DESCRIPTION

Although specific embodiment of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Referring to FIG. 1 with greater particularity, the inventive device 10 shown in perspective view may be seen to comprise a handgrip 22 located at the proximal end 36 of the tool and attached to one end of rod 20. Rod 20 is of a dimension such that it may be slideably inserted into sleeve 18 at its proximal end 28 and is shown in that condition in FIG. 1. Sleeve 18 carries a headpiece 12 near to the distal end 26 of the tool. Headpiece 12 has a headpiece collar 14 and a tool-holding member 16, shown here as the type of tool-holding member usually associated with socket wrenches such as are used in everyday commerce.

Referring now to FIG. 2, details of the interior of sleeve 18 may be examined. The proximal end of sleeve 18 is denoted by the numeral 28 as before. Interior annular grooves 24 are shown in stepped positions along the longitudinal dimension of sleeve 18. Sleeve 18, of course, has been shown in broken cross section with the distal end 26 of the tool and headpiece 12 with its tool-holding member 16 included for clarity.

FIG. 3, regarded in conjunction with FIG. 2, permits explanation of the method by which the integrity of an adjusted position may be maintained. Examination of FIG. 3 shows the distal end 30 of rod 20 and its near environs as cut away to show details of a biasing ball and spring arrangement. Said biasing ball is denoted by numeral 32 and is held in place by biasing spring 34 in a manner well known in the mechanic's tools art. It is the forcing of biasing balls 32 by means of biasing spring 34 into the annular grooves 24 that permits an adjusted position to be maintained thus regulating the length of rod 20 protruding from sleeve 18 for a given position. This overall length, that is, of the sleeve 18 plus the protruding part of rod 20, makes up the lever arm element of the torque equation:

$$torque = force \times lever\ arm.$$

Thus, adjustment of rod 20 into or out of sleeve 18 determines the applied torque by the magnitude of the lever arm so effected.

FIG. 4 shows the mating of rod 20 into sleeve 18 with biasing balls 32 captured into one of the annular grooves 24. A sufficient force exerted in the direction of the arrows will cause the adjustment to be broken and, if the rod 20 is then moved toward another one of the annular grooves 24, a stable length position may be maintained when the balls 32 are forced into the groove 24 under the action of the biasing spring 34. It is thus to be noted that the fineness of length adjustment is dependent only on the specific number, that is, the number per unit length, of the annular grooves 24 in sleeve 18. It is further to be noted that a force applied perpendicular to the direction of the arrows will have no tendency to disturb the adjustment so achieved. It is this perpendicular force that is denoted in the torque equation that is effective in breaking a thread-locked nut or bolt or the like. Thus the applied torque tends to turn the tool-holding member 16 about an axis coincident with the longitudinal dimension of said tool-holding member 16.

Thus, there has been described a torque-multiplier breaker-bar that will multiply the torque applied to a workpiece by adjusting the effective length of the lever arm of the tool. Great improvements in reliability, flexibility, ease of adjustment and economy have been provided through the novel advantages of the invention.

It is pointed out that although the present invention has been shown and described with reference to particular embodiment, nevertheless, various changes and modifications, obvious to one skilled in the art to which the invention pertains are deemed to be within the purview of the invention.

We claim:

1. An adjustable, torque-multiplier breaker-bar which comprises:
   an elongated sleeve;
   a plurality of interior annular grooves in stepped positions along the longitudinal dimension of said sleeve;
   a headpiece secured near the distal end of said sleeve including a headpiece collar secured about said sleeve and said headpiece collar having a tool-holding member;
   a rod, slideably inserted into said sleeve at the proximal end thereof, the rod having a handgrip attached at the proximal end of said rod;
   biasing ball and spring means near the distal end of said rod for cooperating with said annular grooves in maintaining an adjusted position of insertion of said rod into said sleeve; and
   wherein the specific number of said plurality of interior annular grooves is at least one per inch and with the groove closest to the distal end of said sleeve lying in a transverse plane intermediate the terminal ends of said headpiece collar.

2. The device of claim 1, wherein said sleeve is a hollow cylinder having a plurality of stepped interior annular grooves along its interior dimension.

3. The device of claim 2, wherein said rod is a solid cylinder having a ball and spring means near one end thereof.

4. The device of claim 3, wherein said tool-holding member is of the type usually associated with socket wrenches such as are used in everyday commerce.

* * * * *